(12) United States Patent
Althoff et al.

(10) Patent No.: US 7,895,745 B2
(45) Date of Patent: Mar. 1, 2011

(54) METHOD FOR FABRICATING ELONGATED AIRFOILS FOR WIND TURBINES

(75) Inventors: Nicholas Althoff, Ware Shoals, SC (US);
Amir Riahi, Pensacola, FL (US);
Andrew Billen, Daarlerveen (NL);
Willem Bakhuis, Overijssel (NL)

(73) Assignee: General Electric Company, Schenectady, NY (US)

( * ) Notice: Subject to any disclaimer, the term of this patent is extended or adjusted under 35 U.S.C. 154(b) by 907 days.

(21) Appl. No.: 11/684,230

(22) Filed: Mar. 9, 2007

(65) Prior Publication Data

US 2008/0219851 A1    Sep. 11, 2008

(51) Int. Cl.
*B23P 15/04* (2006.01)
*B21K 3/04* (2006.01)

(52) U.S. Cl. .............. 29/889.21; 29/889.71; 29/889.72; 29/463; 416/226; 416/230; 416/233

(58) Field of Classification Search .............. 29/889.21, 29/89.71, 889.72, 463; 416/226, 233, 230, 416/229 R
See application file for complete search history.

(56) References Cited

U.S. PATENT DOCUMENTS

| | | | |
|---|---|---|---|
| 4,474,536 A | 10/1984 | Gougeon et al. | |
| 5,269,058 A * | 12/1993 | Wiggs et al. | 29/889.72 |
| 5,660,527 A | 8/1997 | Deering et al. | |
| 6,327,957 B1 | 12/2001 | Carter, Sr. | |
| 7,118,338 B2 | 10/2006 | Moroz et al. | |
| 7,198,471 B2 * | 4/2007 | Gunneskov et al. | 416/229 R |
| 7,473,385 B2 * | 1/2009 | Stiesdal et al. | 264/314 |

OTHER PUBLICATIONS

Cairns, Douglas S. and Skramstad, Jon D., Evaluation of Hand Lay-Up and Resin Transfer Molding in Composite Wind Turbine Blade Manufacturing, Jun. 2000, 243 pages, Sandia National Laboratories, Albuquerque, New Mexico.

* cited by examiner

*Primary Examiner*—David P Bryant
*Assistant Examiner*—Sarsang Afzali
(74) *Attorney, Agent, or Firm*—McNees Wallace & Nurick LLC (57) ABSTRACT

The present invention includes a method for fabricating elongated wind turbine blades and wind turbine blades formed by the method. The method includes providing a first shell reinforcing fiber structure. At least one shear web reinforcing fiber structure is positioned adjacent to the first shell reinforcing fiber structure. The method includes infusing the first shell reinforcing fiber structure and shear web reinforcing fiber structure with a matrix material and curing the matrix material to form a unitary composite first shell component. Thereafter a composite second shell component is attached to the composite first shell component to form an elongated composite airfoil suitable for use as a wind turbine blade. The wind turbine blades formed include unitary components providing reduced number of adhesive joints.

5 Claims, 6 Drawing Sheets

METHOD FOR FABRICATING ELONGATED AIRFOILS FOR WIND TURBINES

FIELD OF THE INVENTION

The present invention is directed to elongated airfoils for use with wind turbines and methods for fabricating elongated airfoils for wind turbines. In particular, the present invention is directed to wind turbine blades and methods for making wind turbine blades.

BACKGROUND OF THE INVENTION

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple wind turbine blades. The wind turbine blades are elongated airfoils configured to provide rotational forces in response to wind. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid. In order to provide the efficient conversion of mechanical energy to electrical energy, the wind turbine utilizes a variety of wind turbine components, such as shafts, gearing components, pitch drives, generator components and other components within the wind turbine driven by wind turbine blades.

Wind turbine blades may be very large and typically are fabricated utilizing hand lay-up composite fabrication techniques. For example, one method may infuse two outer shells of glass fiber with resin. Once the two shells have been cured, prefabricated, cured composite shear webs are bonded to a load bearing spar of a first shell of the two shells. The bonding typically takes place utilizing an adhesive, such as epoxy or other suitable adhesive. Once the adhesive bonding the first shell to the shear web has cured, the second shell is attached to the shear web and bonded thereto. Thereafter, the entire assembly is cured to provide a finished wind turbine blade. These methods suffer from the drawback that there is a large number of adhesive joints used to join various components together. These adhesive joints undesirably add weight and complexity to the wind turbine blade and increase time required the fabrication process. In addition, the large number of adhesive joints also precludes the ability to have tight tolerances and junctions, particularly at junctions between the shell and the shear web of the wind turbine blade.

What is needed is an improved method for fabricating wind turbine blades utilizing fewer adhesive joints, providing tighter material tolerances that result in a lighter weight blade that does not suffer from the drawbacks of known methods.

SUMMARY OF THE INVENTION

A first aspect of the disclosure includes a method for fabricating elongated wind turbine blades. The method includes providing a first shell reinforcing fiber structure. At least one shear web reinforcing fiber structure is positioned adjacent the first shell reinforcing fiber structure. The method includes infusing first shell reinforcing fiber structure and shear web reinforcing fiber structure with a matrix material and curing the matrix material to form a unitary composite first shell component. Thereafter a composite second shell component is attached to the composite first shell component to form an elongated composite airfoil suitable for use as a wind turbine blade.

Another aspect of the disclosure includes a method for fabricating elongated airfoils for wind turbines. A first spar reinforcing fiber structure, a second spar reinforcing structure and a shear web reinforcing fiber structure are provided. The first spar reinforcing fiber structure and the second spar reinforcing fiber structure are positioned adjacent the shear web reinforcing fiber structure. The method further includes first shell reinforcing fiber structure and shear reinforcing fiber structure with a matrix material and curing the matrix material to form a unitary composite web spar. Thereafter the web spar is attached to each of a first composite first shell component and a composite second shell component to form an elongated composite airfoil structure suitable for use as a wind turbine blade.

Still another aspect of the disclosure includes a wind turbine blade having a first shell portion and a second shell portion adhered to the first shell portion. The first shell portion includes at least one shear web. The wind turbine blade further includes a first shell portion and an integral shear web that are a unitary composite component.

Still another aspect of the disclosure includes a wind turbine blade having a first shell portion and a second shell portion enveloping a web spar. The web spar includes a first spar portion, a second spar portion, and at least one shear web between the first spar portion and the second spar portion. The wind turbine blade includes a first spar portion and a shear web that are a unitary composite component.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
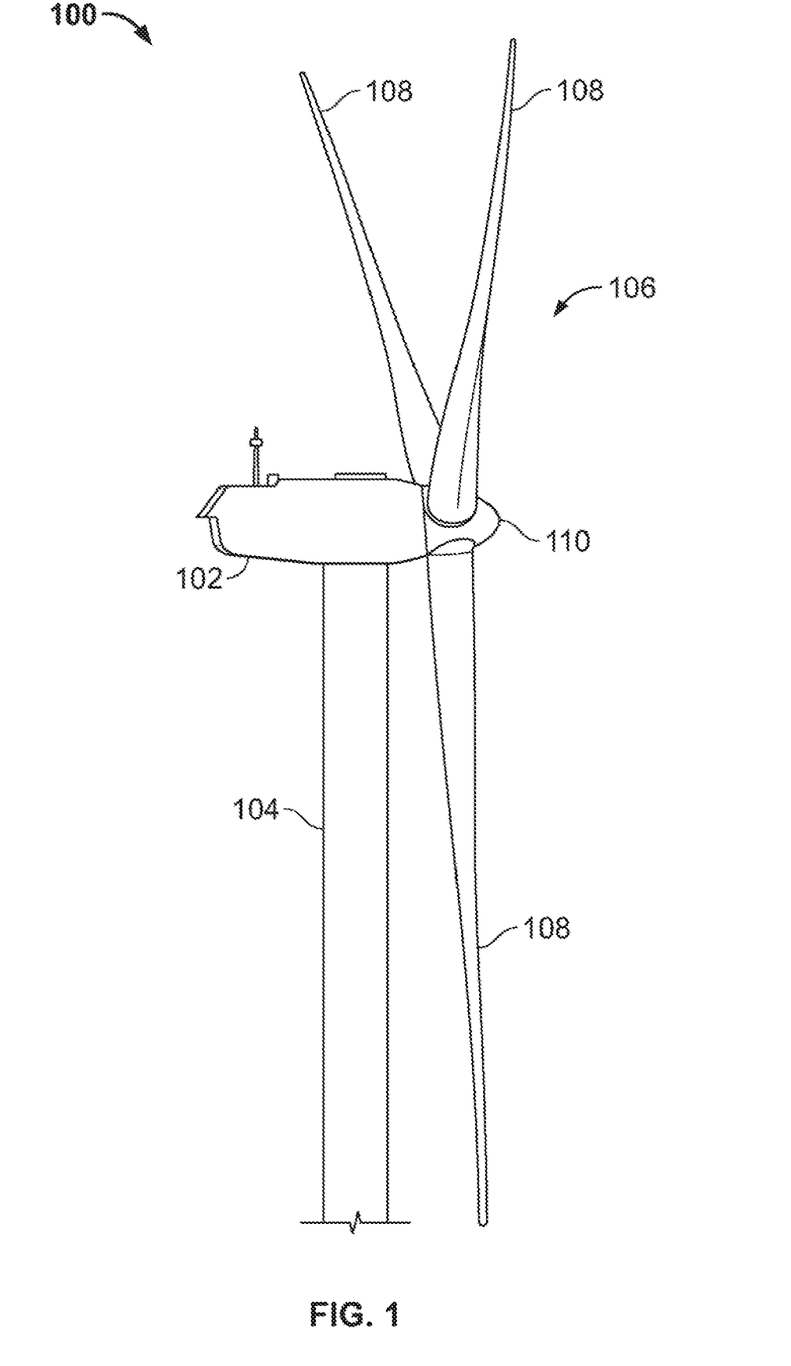
FIG. 1 is a drawing of an exemplary configuration of a wind turbine.

FIG. 1 shows a wind turbine 100 having a nacelle 102 housing a generator (not shown in FIG. 1). Nacelle 102 is a housing mounted atop a tower 104, only a portion of which is shown in FIG. 1. The height of tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or off-shore locations. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present disclosure.

Figure 2:
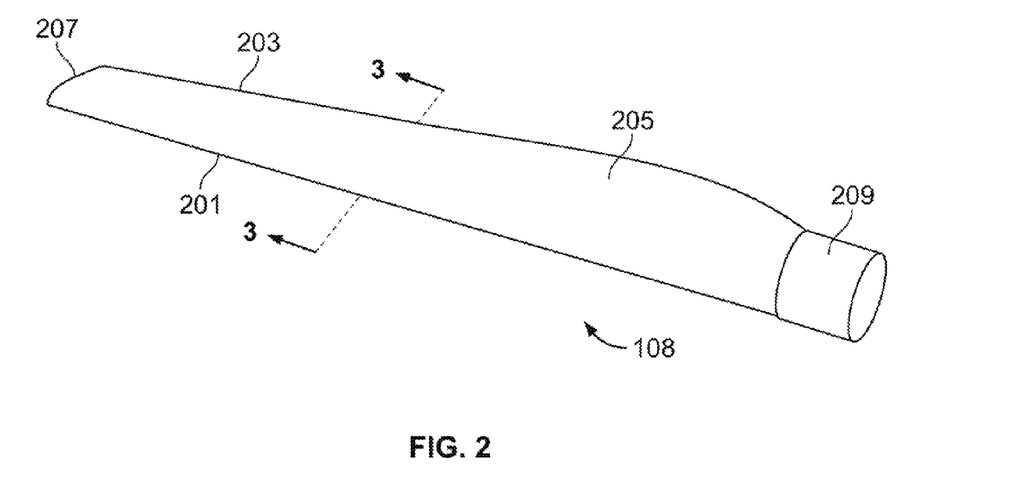
FIG. 2 is a perspective view of a nacelle of the exemplary wind turbine configuration shown in FIG. 1.

FIG. 2 illustrates a turbine blade 108 having a leading edge 201 and a trailing edge 203. The turbine blade 108 includes an airfoil portion 205 extending from the tip 207 to the root 209, which is connectable to the hub 110 of the wind turbine.

Figure 3:
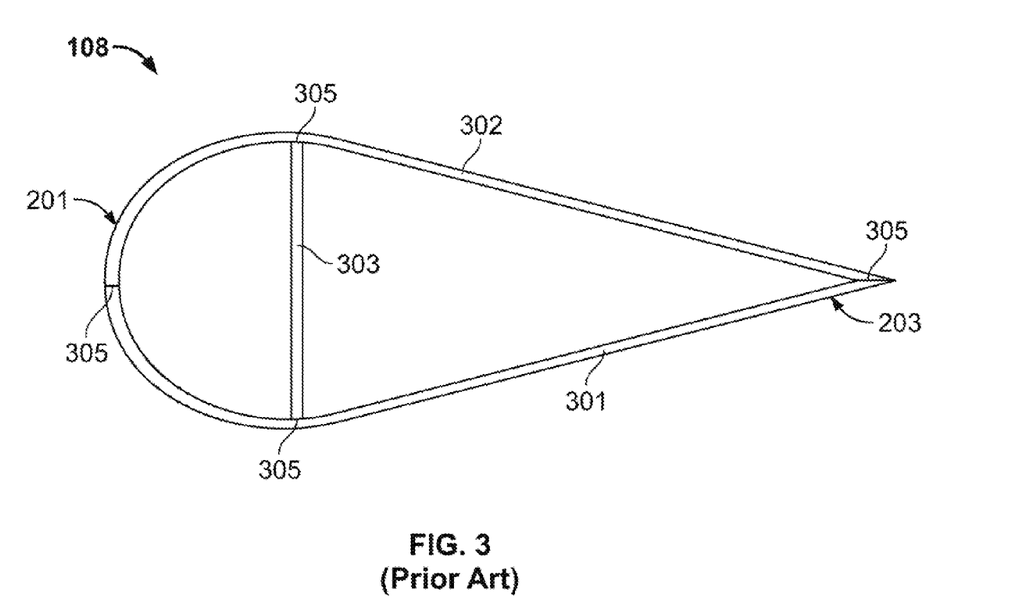
FIG. 3 is a cross-section taken along line 3-3 of FIG. 2 showing the internal structure of a known wind turbine blade.

FIG. 3 illustrates a wind turbine blade having a cross-sectional structure known in the art. FIG. 3 is a cross-section of a wind turbine blade taken along line 3-3 of FIG. 2. The wind turbine blade 108 includes a first shell portion 301 and a second shell portion 302, which are each adhesively bonded to a shear web 303. The joints between the first shell portion 301 and the shear web 303 include an adhesive joint 305. In addition, an additional adhesive joint 305 is placed between the shear web 303 and the second shell portion 302. The first shell portion 301 is also adhered to the second shell portion 302 by adhesive joints 305 adjacent the leading edge 201 and the trailing edge 203. The wind turbine blade of FIG. 3 includes a prefabricated shear web 303 which is formed, infused and cured prior to bringing into contact with the first shell portion 301 and the second shell portion 302. The separate manufacture of the shear web 303 adds to the complexity and time required to assemble the wind turbine blade 108. Further, desired placement of the shear web 303 is difficult to achieve due to the adhesive joints 305 present at opposite ends of the shear web 303 adjacent the first and second shell portions 301 and 302. The use of the plurality of adhesive joints 305 increases the amount of labor required, wherein alignment of the shear web 303 may require several people and/or specialized equipment. In addition, the cycle time to produce a wind turbine blade 108 is excessively long because adhesive curing and curing of pre-manufactured components are required prior to assembly. Further a large amount of adhesive is required to provide all of the adhesive joints 305, which undesirably increases the weight and bulk of the wind turbine blade 108. Further, still, non-uniform bond line thickness and large air voids result from the assembling, curing and assembly of the multiple components of the arrangement shown in FIG. 3.

Figure 4:
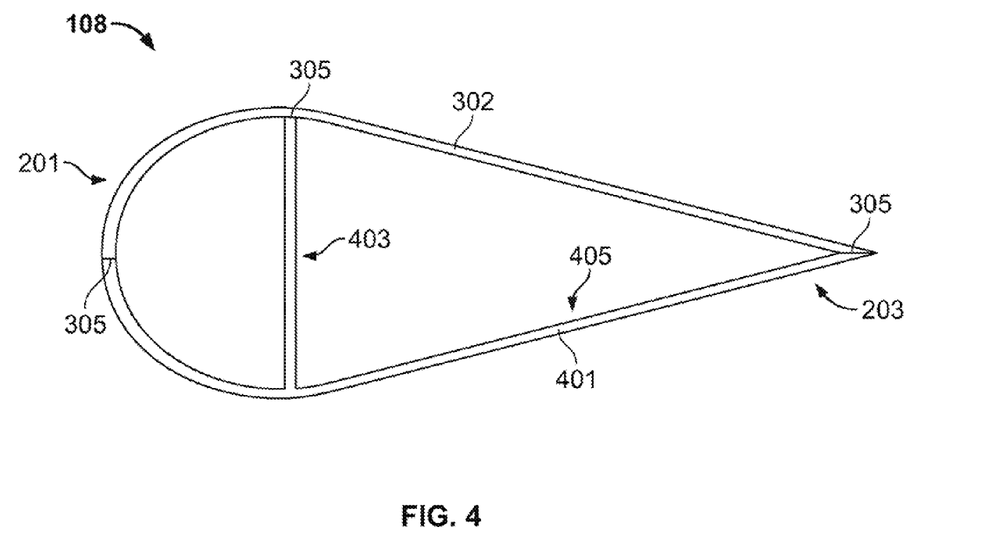
FIG. 4 is a cross-section taken along line 3-3 of FIG. 2 showing a wind turbine blade according to an embodiment of the disclosure.

FIG. 4 shows a wind turbine blade according to an embodiment, wherein a second shell portion 302 is adhered to an integrated first shell 401 by adhesive joints 305 near each of the leading edge 201 and the trailing edge 203. The integrated first shell includes a integrated first shell 401 and a shear web portion 403 made up of a unitary composite component. By unitary composite component it is understood that the component includes a reinforced cured matrix in a unitary body substantially devoid of adhesive joints within the body. Integrated first shell 401 is formed by an infusion of resin or other matrix material into a fiber fabric reinforced form that is configured substantially to the desired geometry of the finished composite integrated first shell 401. For example, the integrated first shell 401 may be formed by providing a single, continuous reinforcing fabric including the shear web portion 403 and the integrated first shell 401 or by placing a reinforcing fabric for the shear web portion 403 adjacent to the reinforcing fabric for the integrated first shell 401 and infusing the shear web portion 403 and the integrated first shell 401 together to form a unitary composite component. The integrated first shell 401 and the second shell portion 302 are fabricated from fiber fabric reinforced with thermosetting or thermoplastic polymer matrix. The reinforcing fabric may be provided in any form suitable for providing reinforcement to the composite component, including uniaxial, biaxial, triaxial or quadaxial weaves, braids, chopped strands, rovings or discontinuous fiber mats. Fibers suitable for reinforcement fabric include glass, carbon fiber, synthetic fibers, such as KEVLAR®, or other lightweight reinforcing fibers. KEVLAR® is a federally registered trademark of E.I. DuPont de Nemours & Company for aromatic polyamide fibers. The integrated shell 401 and shell portion 302 preferably include a stiffening core, such as balsa wood or foam. The stiffening core is disposed intermediate layers of fiber fabric reinforced with matrix material and provide additional rigidity. In one example, the stiffening core is disposed in between layers of fiber fabric reinforced with matrix material. Suitable matrix materials include thermosetting or thermoplastic polymer matrix. Attachment to the integrated first shell 401 may be made by adhesive joints 305. Adhesive joints 305 are formed between surfaces via contact with adhesive compositions known in the art for connecting composite materials. Suitable adhesive compositions include, but are not limited to, epoxy, polyester, methylacrylate, vinylester or other adhesive resin. The geometry of the cross-section of the turbine blade 108 is not limited to the cross-section shown and may include any suitable cross-section that is operable as a wind turbine blade 108. In addition, the configuration and placement of the shear web portion 403 is not limited to the position shown and may include any location in which the wind turbine blade 108 structure is maintained. In addition, a spar cap or other reinforcing structure may also be incorporated into the integrated first shell 301 and/or the second shell portion 302.

Figure 5:
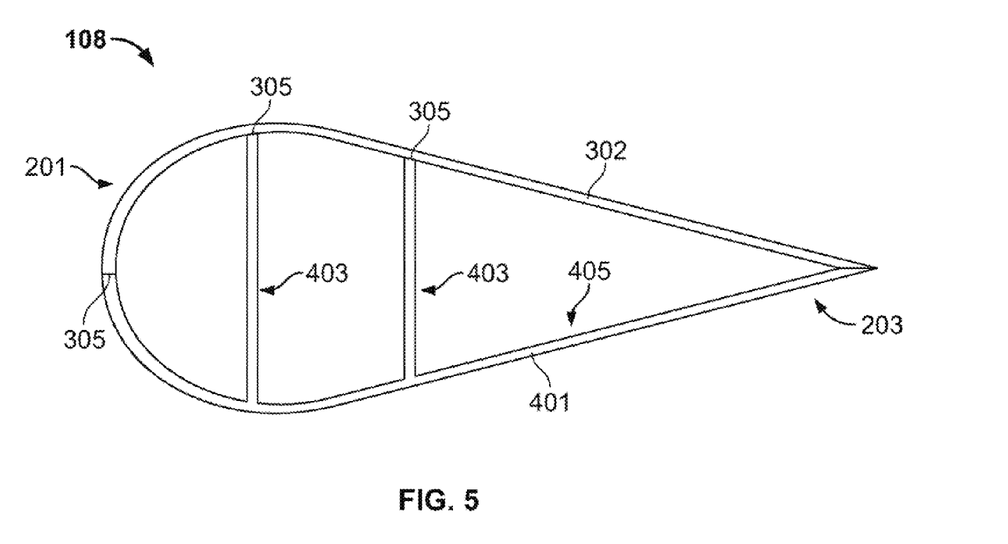
FIG. 5 is a cross-section taken along line 3-3 of FIG. 2 showing a wind turbine blade according to another embodiment of the disclosure.

FIG. 5 illustrates another embodiment of a wind turbine blade 108. As shown in FIG. 4, the second shell portion 302 is adhered to an integrated first shell 401 by adhesive joints 305 near each of the leading edge 201 and the trailing edge 203. In FIG. 5, the integrated first shell 401 includes a plurality of shear web portions 403. The number of shear web portions 403 present is not limited and may be one or any number of shear web portions 403 that provide the desired support to the wind turbine blade 108. Additional shear web portions 403 on the integrated first shell 401 provide additional structural support. In a further embodiment, each of the integrated first shell 401 and second shell portion 302 can contain one or more shear web portions 403, the second shell portion 302 and shear web portion 403 being of unitary construction.

Figure 6:
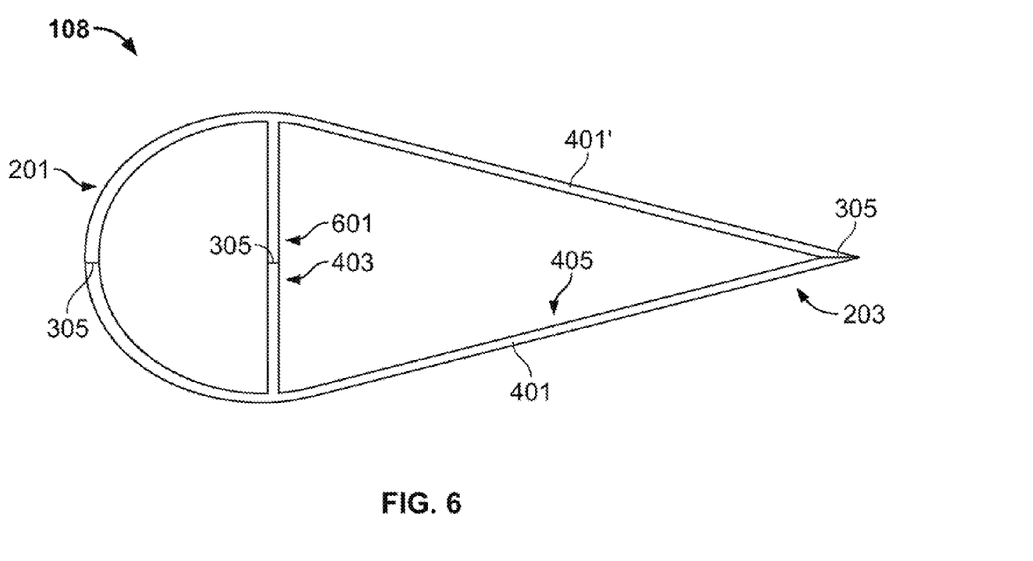
FIG. 6 is a cross-section taken along line 3-3 of FIG. 2 showing a wind turbine blade according to still another embodiment of the disclosure.

FIG. 6 shows a wind turbine blade according to an embodiment, wherein an integrated first shell 401 is adhered to an integrated second shell 401' by adhesive joints 305 near each of the leading edge 201 and the trailing edge 203 and at a center point 601. The integrated first shell 401 and integrated second shell 401' include integrated first shell 401 and a shear web portion 403 made up of a unitary composite component. At a center point 601 an adhesive joint 305 is disposed between a shear web portion 403 of the integrated first shell 401 and a shear web portion 403 of an integrated second shell 401'. Although FIG. 6 shows center point 601 substantially equidistant from the integrated first shell 401 and integrated second shell 401', the center point 601 may be any location along the shear web portion 403. Each of integrated first shell 401 and integrated second shell 401' are formed by an infusion of resin or other matrix material into a fiber fabric reinforced form that is configured substantially to the desired geometry of the finished composite integrated shells 401, 401'. In this embodiment, the first and second integrated shells 401, 401' may be identical or dissimilar. Although not required, the manufacture of identical integrated first shells 401 and integrated second shells 401' may provide ease of manufacture and mold fabrication, providing for reduced manufacturing costs.

Figure 7:
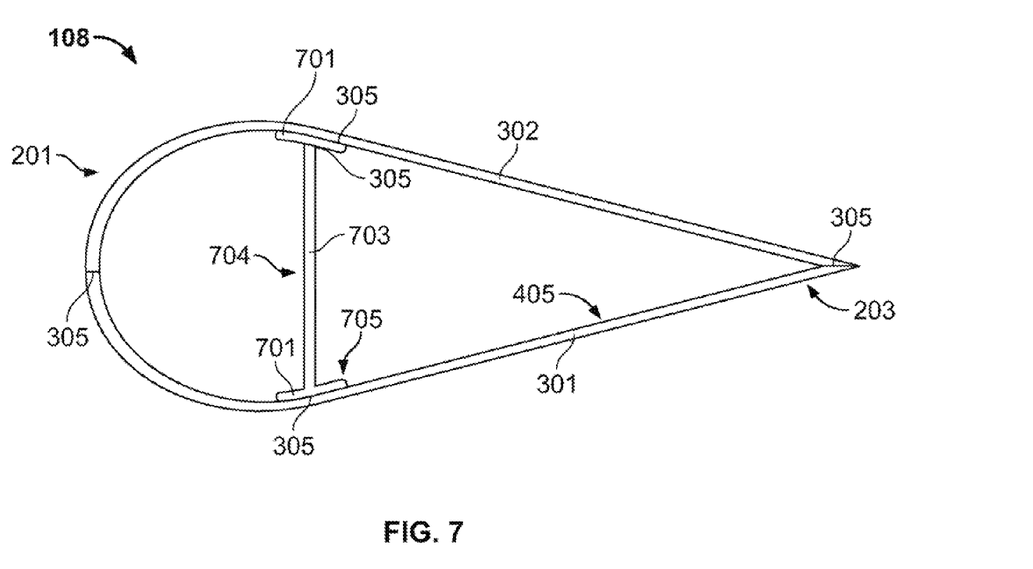
FIG. 7 is a cross-section taken along line 3-3 of FIG. 2 showing a wind turbine blade according to still another embodiment of the disclosure.

FIG. 7 illustrates still another embodiment of a wind turbine blade 108 including a spar web 703 between the first shell portion 301 and the second shell portion 302. FIG. 7 includes spar caps 701 at opposite ends of the spar web 703. The spar cap 701 includes a composition and structure that provides structural reinforcement for the wind turbine blade 108. Suitable fibers for the spar cap include, but are not limited to, glass, carbon or hybrid fibers. The spar cap 701 may also include matrix material including, but not limited to epoxy, polyester, vinylester matrix material. As shown in FIG. 3, the second shell portion 302 is adhered to a first integrated first shell 401 by adhesive joints 305 near each of the leading edge 201 and the trailing edge 203. However, a "T"-shaped spar web 703 is adhered to the first shell portion 301. Attachment of the spar web 703 may be provided by adhesive joints 305 and may, optionally include surface preparation, such as roughening. The spar web 703 includes the spar cap portion 705, which includes the spar cap 701 adhered to the first shell portion 301 and the web portion 704. The spar web 703 is further adhered to the spar cap 701 adhered to the second shell portion 301. The adhesive joints 305 may include adhesives, or may include incorporation into the shell portions 301 or 302 by matrix infusion. The spar web 703 is fabricated as a single component wherein the spar cap portion 705 and the web portion 704 are formed into a unitary composite component by providing a single reinforcing fabric including the web portion 704 and the spar cap portion 705 or by placing a reinforcing fabric for the web portion 704 adjacent to the reinforcing fabric for the spar cap portion 705 and infusing the web portion 704 and spar cap portion 705 together to form a unitary composite component.

Figure 8:
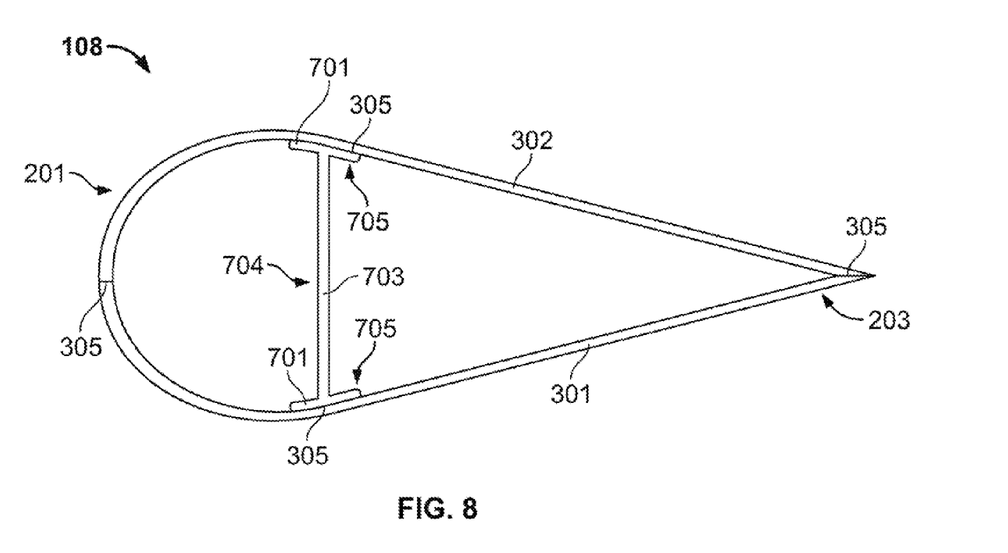
FIG. 8 is a cross-section taken along line 3-3 of FIG. 2 showing a wind turbine blade according to still another embodiment of the disclosure.

FIG. 8 illustrates still another embodiment of a wind turbine blade 108 including a spar web 703 between the first shell portion 301 and the second shell portion 302. As in FIG. 7, the wind turbine blade 108 includes spar caps 701 at opposite ends of the spar web 703. In addition, the second shell portion 302 is adhered to a first integrated first shell 401 by adhesive joints 305 near each of the leading edge 201 and the trailing edge 203. However, a "I"-shaped spar web 703 is adhered to the first shell portion 301 and the second shell portion 302. Attachment of the spar web 703 may be provided by adhesive joints 305 and may, optionally include surface preparation, such as roughening. The spar web 703 includes spar cap portions 705, which includes the spar caps 701 adhered to the first shell portion 301 and the shell portion by adhesive joints 305. The adhesive joints 305 may include adhesives, or may include incorporation into the shell portions 301 or 302 by matrix material infusion. The spar web 703 may be fabricated with the spar cap portions 705 and the web portion 704 are formed into a unitary composite component by providing a single, continuous reinforcing fabric including the web portion 704 and the spar cap portions 705 or by placing a reinforcing fabric for the web portion 704 adjacent to the reinforcing fabric for the spar cap portions 705 and infusing the web portion 704 and spar cap portions 705 together to form a unitary composite component.

Figure 9:
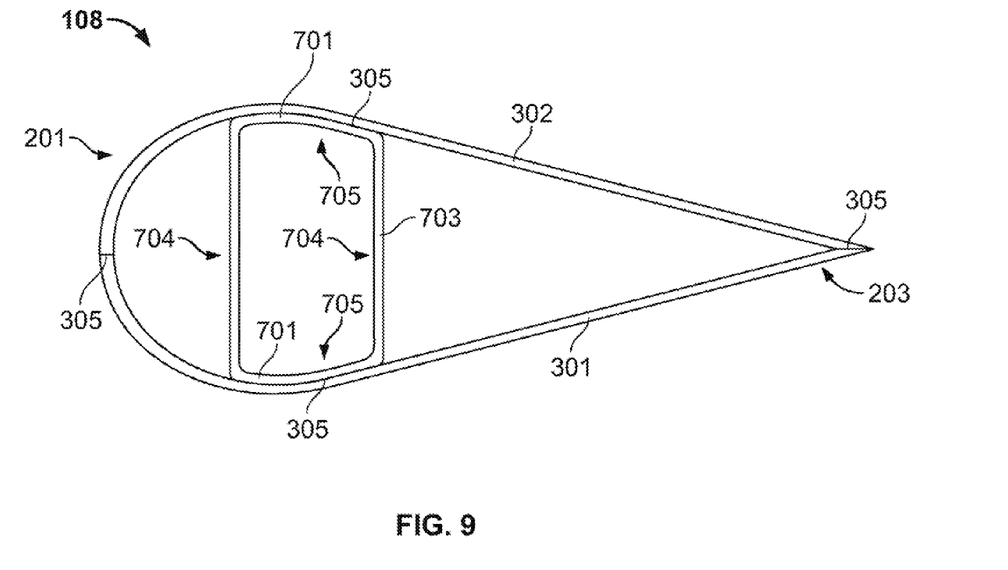
FIG. 9 is a cross-section taken along line 3-3 of FIG. 2 showing a wind turbine blade according to still another embodiment of the disclosure.

FIG. 9 illustrates still another embodiment of a wind turbine blade 108 including a plurality of spar webs 703 forming an enclosure, such as a box. As in FIG. 7, the wind turbine blade 108 includes spar caps 701. In addition, the second shell portion 302 is adhered to a first integrated first shell 401 by adhesive joints 305 near each of the leading edge 201 and the trailing edge 203. A box-shaped spar web 703 is adhered to the first shell portion 301 and the second shell portion 302. Attachment of the spar web 703 may be provided by adhesive joints 305 and may, optionally include surface preparation, such as roughening. The spar web 703 includes spar cap portions 705, which includes the spar caps 701 adhered to the first shell portion 301 and the shell portion by adhesive joints 305. The adhesive joints 305 may include adhesives, or may include incorporation into the shell portions 301 or 302 by matrix infusion. The spar web 703 may be fabricated with the spar cap portions 705 and the web portions 704 are formed into a unitary composite component by providing a single, continuous reinforcing fabric including the web portions 704 and the spar cap portions 705 or by placing a reinforcing fabric for the web portions 704 adjacent to the reinforcing fabric for the spar cap portions 705 and infusing the web portions 704 and spar cap portions 705 together to form a unitary composite component.

Figure 10:
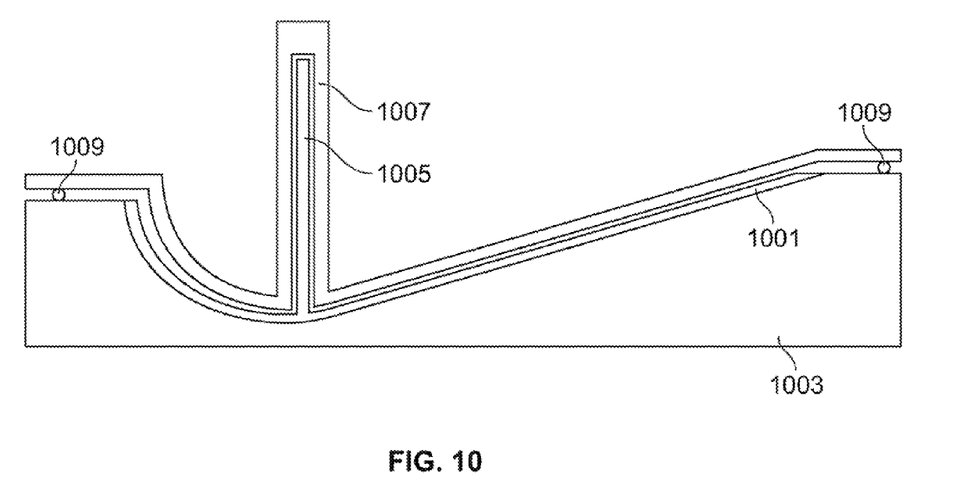
FIG. 10 is a cross-sectional view of an apparatus for making a wind turbine blade according to an embodiment of the disclosure.

Integrated first integrated first shell 401 and spar web 703 may be formed using any suitable composite forming method. Suitable methods include, but are not limited to, resin transfer molding (RTM), vacuum assisted resin transfer molding (VARTM), resin infusion method (RIM) or any other suitable resin infusion method for forming fiber reinforced composites. In an embodiment of the present invention shown in FIG. 10, a first shell fiber fabric 1001 is placed on a shell mold 1003. Although FIG. 10 illustrates a lay-up mold, any type of mold that provides the desired wind turbine blade geometry may be used, including mold geometries that are capable of conforming to wind turbine blades 108 that exceed 20 meters in length. A shear web fiber fabric 1005 is positioned adjacent to the first shell fiber fabric 1001, wherein a shear web mold 1007 may be placed over the first shell fiber fabric 1001 to position the shear web fiber fabric 1005 with respect to the first shell fiber fabric 1001. The shear web mold 1007 is any mold capable of being configured to conform to the geometry of the shear web portion 403, including the shear web lengths that may exceed 20 meters in length. The shear web mold 1007 extends overlying the surface of the first shell fiber fabric 1001 and shear web fiber fabric 1001. The shear web mold 1007 is sealed against shell mold 1003 via seal 1009 in order to allow drawing of vacuum on the first shell fiber fabric 1001 and shear web fiber fabric 1001 space. Seal 1009 may include any conventional sealing material suitable for vacuum sealing. During matrix infiltration, matrix material flows and fills voids within the fabric, wherein entrained air pockets are removed by the vacuum applied. Once cured, the matrix hardens and forms a reinforced composite. The formed integrated first shell 401 includes a unitary shear web portion 403 and shell portion 405 (see e.g., FIG. 11). Structures having a plurality of shear web portions 403 are fabricated using a similar process wherein a plurality of shear molds 1007 are utilized to position additional shear web fiber fabric for forming a plurality of shear web portions 403. Release materials/coatings, filler reinforcement materials, matrix additives, peelply, transfer media, release film and/or other consumable and/or conventional material for use with infusion processes may be utilized in the formation of the wind turbine blade 108.

Figure 11:
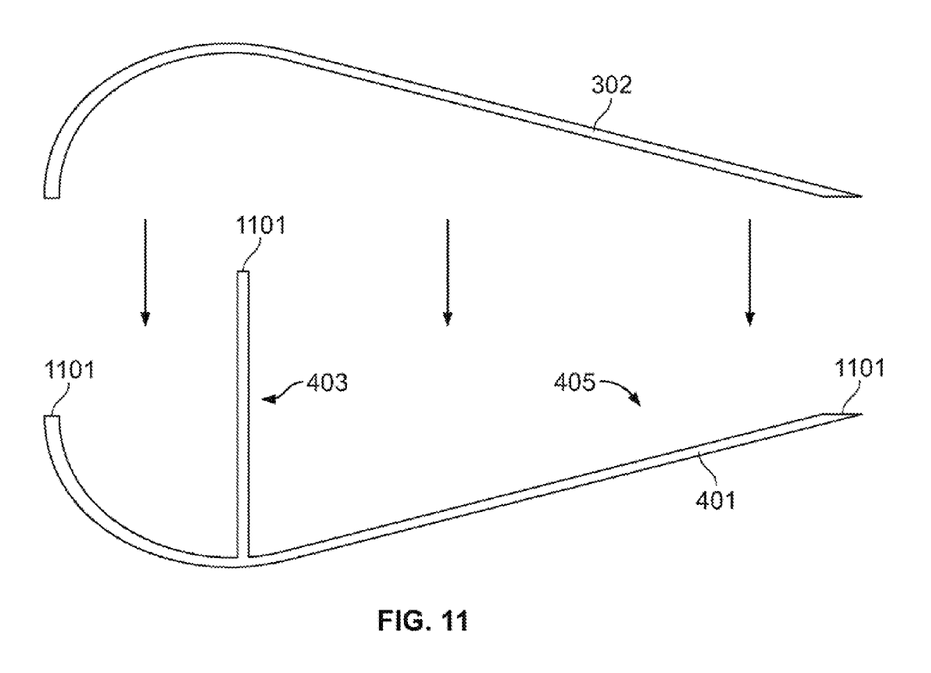
FIG. 11 is a cross-sectional view of a wind turbine blade being assembled according to an embodiment of the disclosure.

As shown in FIG. 11, subsequent to matrix material curing of the integrated shell components, the integrated first shell 401 may be brought into contact with a second shell portion 302, wherein adhesive joints 305 (see e.g., FIG. 4) are applied to contact surfaces 1101. The adhesive joints 305 are permitted to cure forming a wind turbine blade 108 structure.

While the FIGS. 10 and 11 show and describe a process for forming an integrated first shell 401, the same process may be utilized to produce a spar web 703, wherein the fabric forming the reinforcement for the spar web 703 is positioned on a mold and resin is infused, according to a suitable matrix infusion method, into the fiber to form a composite wind turbine blade. The methods disclosed are suitable for fabrication of wind turbine blades having lengths greater than about 10 meters, preferably greater than about 20 meters and more preferably greater than about 50 meters.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for fabricating elongated airfoils for wind turbines comprising:
   providing a first shell reinforcing fiber structure;
   positioning at least one shear web reinforcing fiber structure adjacent the first shell reinforcing fiber structure;
   infusing the first shell reinforcing fiber structure and shear web reinforcing fiber structure with a matrix material and curing the matrix material to form a unitary composite first shell component; and
   attaching a composite second shell component to the composite first shell component to form an elongated composite airfoil structure;
   wherein the positioning includes providing a mold conforming to the desired geometry of a shear web portion of the unitary composite first shell component.

2. The method of claim 1, wherein at least one of the first shell reinforcing fiber structure, the second shell reinforcing fiber structure or the shear web reinforcing fiber structure includes a stiffener material.

3. The method of claim 2, wherein the stiffener material is balsa or foam.

4. The method of claim 1, wherein the infusing step comprises a technique selected from the group consisting of resin transfer molding, vacuum assisted resin transfer molding, resin film infusion, resin infusion or combinations thereof.

5. The method of claim 1, wherein the second shell component includes a unitary composite second shell component having a unitary second shell component and an integral shear web.

* * * * *